United States Patent
Salter et al.

(10) Patent No.: US 12,094,206 B2
(45) Date of Patent: Sep. 17, 2024

(54) METHOD AND DEVICE FOR VISUAL AUGMENTATION OF SPORTING EVENTS

(71) Applicant: Apple Inc., Cupertino, CA (US)

(72) Inventors: Thomas G. Salter, Foster City, CA (US); Brian Warren Temple, Santa Clara, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 18/200,751

(22) Filed: May 23, 2023

(65) Prior Publication Data

US 2023/0298349 A1 Sep. 21, 2023

Related U.S. Application Data

(63) Continuation of application No. 17/379,676, filed on Jul. 19, 2021, now Pat. No. 11,688,168.

(60) Provisional application No. 63/060,347, filed on Aug. 3, 2020.

(51) Int. Cl.
  *G06T 19/00* (2011.01)
  *G06V 20/40* (2022.01)
(52) U.S. Cl.
  CPC ............ *G06V 20/42* (2022.01); *G06T 19/006* (2013.01); *G06V 20/44* (2022.01)
(58) Field of Classification Search
  None
  See application file for complete search history.

(56) References Cited

U.S. PATENT DOCUMENTS

| | | | |
|---|---|---|---|
| 9,345,957 B2 | 5/2016 | Geisner et al. | |
| 9,630,105 B2 | 4/2017 | Stafford | |
| 9,818,230 B2 | 11/2017 | Moravetz | |
| 10,325,410 B1 | 6/2019 | Smith et al. | |
| 2008/0089666 A1 | 4/2008 | Aman | |
| 2017/0269685 A1 | 9/2017 | Marks et al. | |
| 2020/0193976 A1 | 6/2020 | Cartwright et al. | |

OTHER PUBLICATIONS

Siu et al., "SidebARs: Improving awareness of off-screen elements in mobile augmented reality", 2013. (Year: 2013).*
Choi et al., "Tracking the Ball and Players from Multiple Football Vidoes," World Scientific Publishing Company, 2006.

* cited by examiner

*Primary Examiner* — Nicholas R Wilson
(74) *Attorney, Agent, or Firm* — Fernando & Partners, LLP

(57) ABSTRACT

In one implementation, a method of displaying sports data is performed by a device including an image sensor, a display, one or more processors, and non-transitory memory. The method includes obtaining, using the image sensor, an image of a physical environment including a sporting event. The method includes detecting, in the image of the physical environment, an object. The method includes obtaining data regarding a current state of the sporting event with respect to the object. The method includes displaying, on the display in association with the physical environment, a representation of the data.

20 Claims, 8 Drawing Sheets

600

At a device including an image sensor, a display, one or more processors, and non-transitory memory: ⎯610

Obtaining, using the image sensor, an image of a physical environment including a sporting event

↓

Detecting, in the image of the physical environment, an object ⎯620

↓

Obtaining data regarding a current state of the sporting event with respect to the object ⎯630

↓

Displaying, on the display in association with the physical environment, a representation of the data ⎯640

600

| At a device including an image sensor, a display, one or more processors, and non-transitory memory: Obtaining, using the image sensor, an image of a physical environment including a sporting event | ← 610 |

| Detecting, in the image of the physical environment, an object | ← 620 |

| Obtaining data regarding a current state of the sporting event with respect to the object | ← 630 |

| Displaying, on the display in association with the physical environment, a representation of the data | ← 640 |

Figure 6

METHOD AND DEVICE FOR VISUAL AUGMENTATION OF SPORTING EVENTS

CROSS-REFERENCE TO RELATED APPLICATIONS

This application is a continuation of U.S. patent application Ser. No. 17/379,676, filed on Jul. 19, 2021, which claims priority to U.S. Provisional Patent App. No. 63/060,347, filed on Aug. 3, 2020, which are both hereby incorporated by reference in their entirety.

TECHNICAL FIELD

The present disclosure generally relates to systems, methods, and devices for visual augmentation of sporting events.

BACKGROUND

People have become accustomed to supplemental information being displayed while watching a sporting event on television. For example, a yellow first-down line may be displayed over the field during broadcast of a football game. As another example, the score may be displayed in the lower right corner during broadcast of a basketball game. However, when physically present at a sporting event, a person watching the sporting event live does not receive the same experience.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

FIG. 6 is a flowchart representation of a method of displaying a task list in accordance with some implementations.

Figure 1:
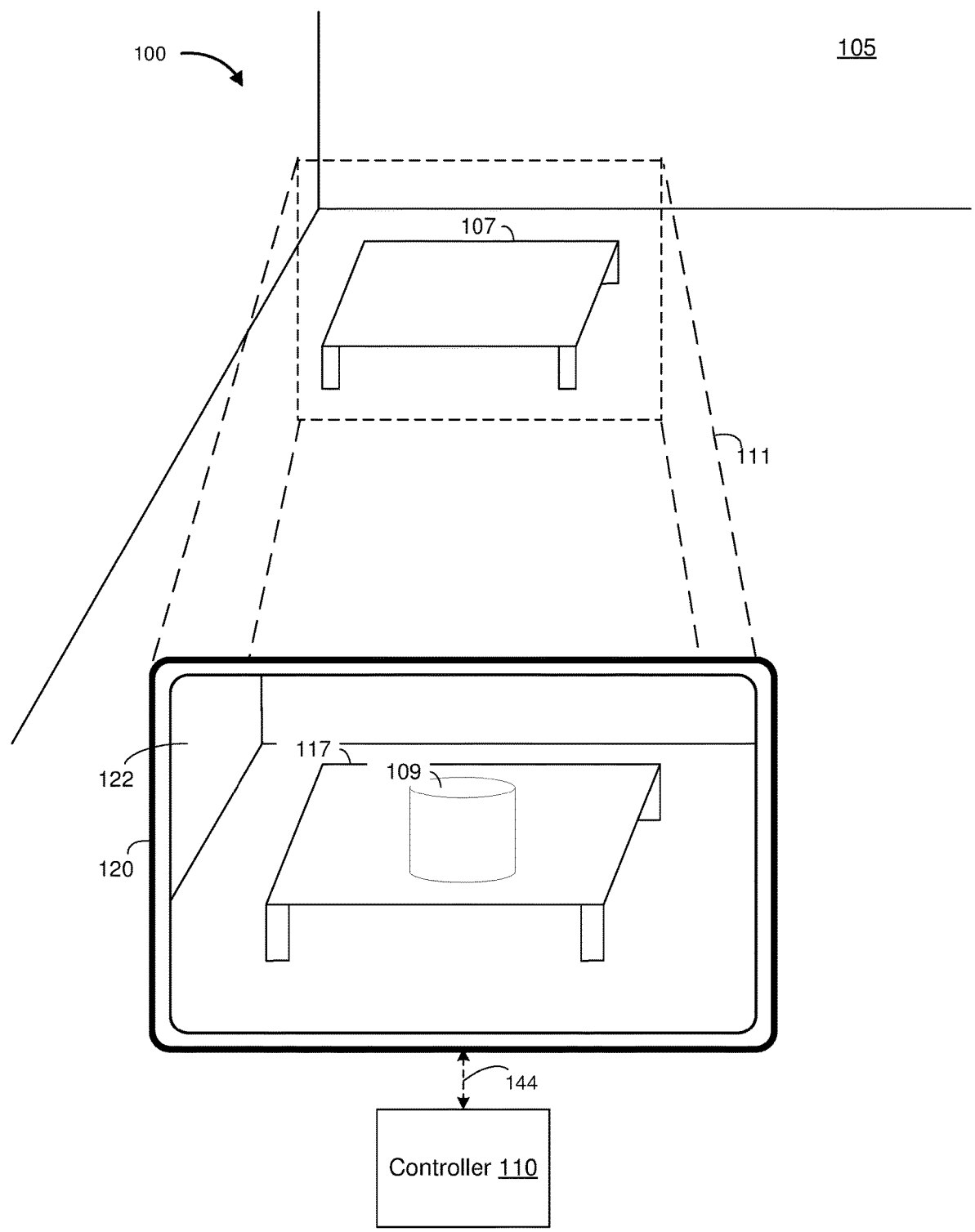
FIG. 1 is a block diagram of an example operating environment in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

SUMMARY

Various implementations disclosed herein include devices, systems, and methods for displaying sports data. In various implementations, the method is performed by a device including an image sensor, a display, one or more processors, and non-transitory memory. The method includes obtaining, using the image sensor, an image of a physical environment including a sporting event. The method includes detecting, in the image of the physical environment, an object. The method includes obtaining data regarding a current state of the sporting event with respect to the object. The method includes displaying, on the display in association with the physical environment, a representation of the data.

In accordance with some implementations, a device includes one or more processors, a non-transitory memory, and one or more programs; the one or more programs are stored in the non-transitory memory and configured to be executed by the one or more processors. The one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes: one or more processors, a non-transitory memory, and means for performing or causing performance of any of the methods described herein.

DESCRIPTION

A physical environment refers to a physical place that people can sense and/or interact with without aid of electronic devices. The physical environment may include physical features such as a physical surface or a physical object. For example, the physical environment corresponds to a physical park that includes physical trees, physical buildings, and physical people. People can directly sense and/or interact with the physical environment such as through sight, touch, hearing, taste, and smell. In contrast, an extended reality (XR) environment refers to a wholly or partially simulated environment that people sense and/or interact with via an electronic device. For example, the XR environment may include augmented reality (AR) content, mixed reality (MR) content, virtual reality (VR) content, and/or the like. With an XR system, a subset of a person's physical motions, or representations thereof, are tracked, and, in response, one or more characteristics of one or more virtual objects simulated in the XR environment are adjusted in a manner that comports with at least one law of physics. As an example, the XR system may detect movement of the electronic device presenting the XR environment (e.g., a mobile phone, a tablet, a laptop, a head-mounted device, and/or the like) and, in response, adjust graphical content and an acoustic field presented by the electronic device to the person in a manner similar to how such views and sounds would change in a physical environment. In some situations (e.g., for accessibility reasons), the XR system may adjust characteristic(s) of graphical content in the XR environment in response to representations of physical motions (e.g., vocal commands).

There are many different types of electronic systems that enable a person to sense and/or interact with various XR environments. Examples include head-mountable systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head-mountable system may have one or more speaker(s) and an integrated opaque display. Alternatively, a head-mountable system may be configured to accept an external opaque display (e.g., a smartphone). The head-mountable system may incorporate one or more imaging sensors to capture images or video of the physical environment, and/or one or more microphones to capture audio of the physical environment. Rather than an opaque display, a head-mountable system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light sources, or any combination of these technologies. The medium may be an optical waveguide, a hologram medium, an optical combiner, an optical reflector, or any combination thereof. In some implementations, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices, and circuits have not been described in exhaustive detail so as not to obscure more pertinent aspects of the example implementations described herein.

A person physically present at a sporting event may desire to know supplemental information about the current state of the sporting event. In particular, the person may desire to know the supplemental information without ceasing to watch the sporting event. Thus, in various implementations, a device obtains and displays such supplemental information over a view of the sporting event.

FIG. 1 is a block diagram of an example operating environment 100 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the operating environment 100 includes a controller 110 and an electronic device 120.

In some implementations, the controller 110 is configured to manage and coordinate an XR experience for the user. In some implementations, the controller 110 includes a suitable combination of software, firmware, and/or hardware. The controller 110 is described in greater detail below with respect to FIG. 2. In some implementations, the controller 110 is a computing device that is local or remote relative to the physical environment 105. For example, the controller 110 is a local server located within the physical environment 105. In another example, the controller 110 is a remote server located outside of the physical environment 105 (e.g., a cloud server, central server, etc.). In some implementations, the controller 110 is communicatively coupled with the electronic device 120 via one or more wired or wireless communication channels 144 (e.g., BLUETOOTH, IEEE 802.11x, IEEE 802.16x, IEEE 802.3x, etc.). In another example, the controller 110 is included within the enclosure of the electronic device 120. In some implementations, the functionalities of the controller 110 are provided by and/or combined with the electronic device 120.

In some implementations, the electronic device 120 is configured to provide the XR experience to the user. In some implementations, the electronic device 120 includes a suitable combination of software, firmware, and/or hardware. According to some implementations, the electronic device 120 presents, via a display 122, XR content to the user while the user is physically present within the physical environment 105 that includes a table 107 within the field-of-view 111 of the electronic device 120. As such, in some implementations, the user holds the electronic device 120 in his/her hand(s). In some implementations, while providing XR content, the electronic device 120 is configured to display a virtual object (e.g., a virtual cylinder 109) and to enable video pass-through of the physical environment 105 (e.g., including a representation 117 of the table 107) on a display 122. The electronic device 120 is described in greater detail below with respect to FIG. 3.

According to some implementations, the electronic device 120 provides an XR experience to the user while the user is virtually and/or physically present within the physical environment 105.

In some implementations, the user wears the electronic device 120 on his/her head. For example, in some implementations, the electronic device includes a head-mounted system (HMS), head-mounted device (HMD), or head-mounted enclosure (HME). As such, the electronic device 120 includes one or more XR displays provided to display the XR content. For example, in various implementations, the electronic device 120 encloses the field-of-view of the user. In some implementations, the electronic device 120 is a handheld device (such as a smartphone or tablet) configured to present XR content, and rather than wearing the electronic device 120, the user holds the device with a display directed towards the field-of-view of the user and a camera directed towards the physical environment 105. In some implementations, the handheld device can be placed within an enclosure that can be worn on the head of the user. In some implementations, the electronic device 120 is replaced with an XR chamber, enclosure, or room configured to present XR content in which the user does not wear or hold the electronic device 120.

Figure 2:
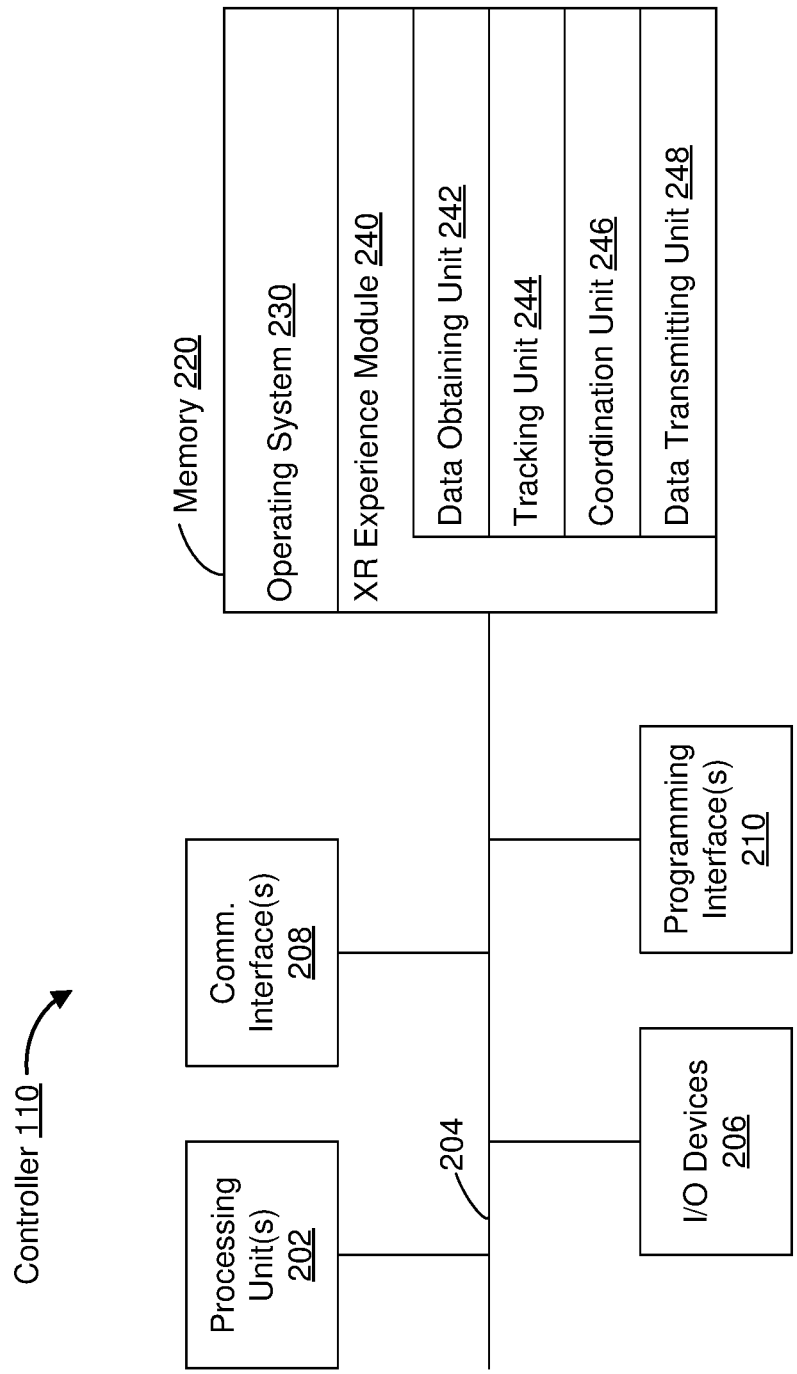
FIG. 2 is a block diagram of an example controller in accordance with some implementations.

FIG. 2 is a block diagram of an example of the controller 110 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the controller 110 includes one or more processing units 202 (e.g., microprocessors, application-specific integrated-circuits (ASICs), field-programmable gate arrays (FPGAs), graphics processing units (GPUs), central processing units (CPUs), processing cores, and/or the like), one or more input/output (I/O) devices 206, one or more communication interfaces 208 (e.g., universal serial bus (USB), FIREWIRE, THUNDERBOLT, IEEE 802.3x, IEEE 802.11x, IEEE 802.16x, global system for mobile communications (GSM), code division multiple access (CDMA), time division multiple access (TDMA), global positioning system (GPS), infrared (IR), BLUETOOTH, ZIGBEE, and/or the like type interface), one or more programming (e.g., I/O) interfaces 210, a memory 220, and one or more communication buses 204 for interconnecting these and various other components.

In some implementations, the one or more communication buses 204 include circuitry that interconnects and controls communications between system components. In some implementations, the one or more I/O devices 206 include at least one of a keyboard, a mouse, a touchpad, a joystick, one or more microphones, one or more speakers, one or more image sensors, one or more displays, and/or the like.

The memory 220 includes high-speed random-access memory, such as dynamic random-access memory (DRAM), static random-access memory (SRAM), double-data-rate random-access memory (DDR RAM), or other random-access solid-state memory devices. In some implementations, the memory 220 includes non-volatile memory, such as one or more magnetic disk storage devices, optical disk storage devices, flash memory devices, or other non-volatile solid-state storage devices. The memory 220 optionally includes one or more storage devices remotely located from the one or more processing units 202. The memory 220 comprises a non-transitory computer readable storage medium. In some implementations, the memory 220 or the non-transitory computer readable storage medium of the memory 220 stores the following programs, modules and data structures, or a subset thereof including an optional operating system 230 and am XR experience module 240.

The operating system 230 includes procedures for handling various basic system services and for performing hardware dependent tasks. In some implementations, the XR experience module 240 is configured to manage and coordinate one or more XR experiences for one or more users (e.g., a single XR experience for one or more users, or multiple XR experiences for respective groups of one or more users). To that end, in various implementations, the XR experience module 240 includes a data obtaining unit 242, a tracking unit 244, a coordination unit 246, and a data transmitting unit 248.

In some implementations, the data obtaining unit 242 is configured to obtain data (e.g., presentation data, interaction data, sensor data, location data, etc.) from at least the electronic device 120 of FIG. 1. To that end, in various implementations, the data obtaining unit 242 includes instructions and/or logic therefor, and heuristics and metadata therefor.

In some implementations, the tracking unit 244 is configured to map the physical environment 105 and to track the position/location of at least the electronic device 120 with respect to the physical environment 105 of FIG. 1. To that end, in various implementations, the tracking unit 244 includes instructions and/or logic therefor, and heuristics and metadata therefor.

In some implementations, the coordination unit 246 is configured to manage and coordinate the XR experience presented to the user by the electronic device 120. To that end, in various implementations, the coordination unit 246 includes instructions and/or logic therefor, and heuristics and metadata therefor.

In some implementations, the data transmitting unit 248 is configured to transmit data (e.g., presentation data, location data, etc.) to at least the electronic device 120. To that end, in various implementations, the data transmitting unit 248 includes instructions and/or logic therefor, and heuristics and metadata therefor.

Although the data obtaining unit 242, the tracking unit 244, the coordination unit 246, and the data transmitting unit 248 are shown as residing on a single device (e.g., the controller 110), it should be understood that in other implementations, any combination of the data obtaining unit 242, the tracking unit 244, the coordination unit 246, and the data transmitting unit 248 may be located in separate computing devices.

Moreover, FIG. 2 is intended more as functional description of the various features that may be present in a particular implementation as opposed to a structural schematic of the implementations described herein. As recognized by those of ordinary skill in the art, items shown separately could be combined and some items could be separated. For example, some functional modules shown separately in FIG. 2 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

Figure 3:
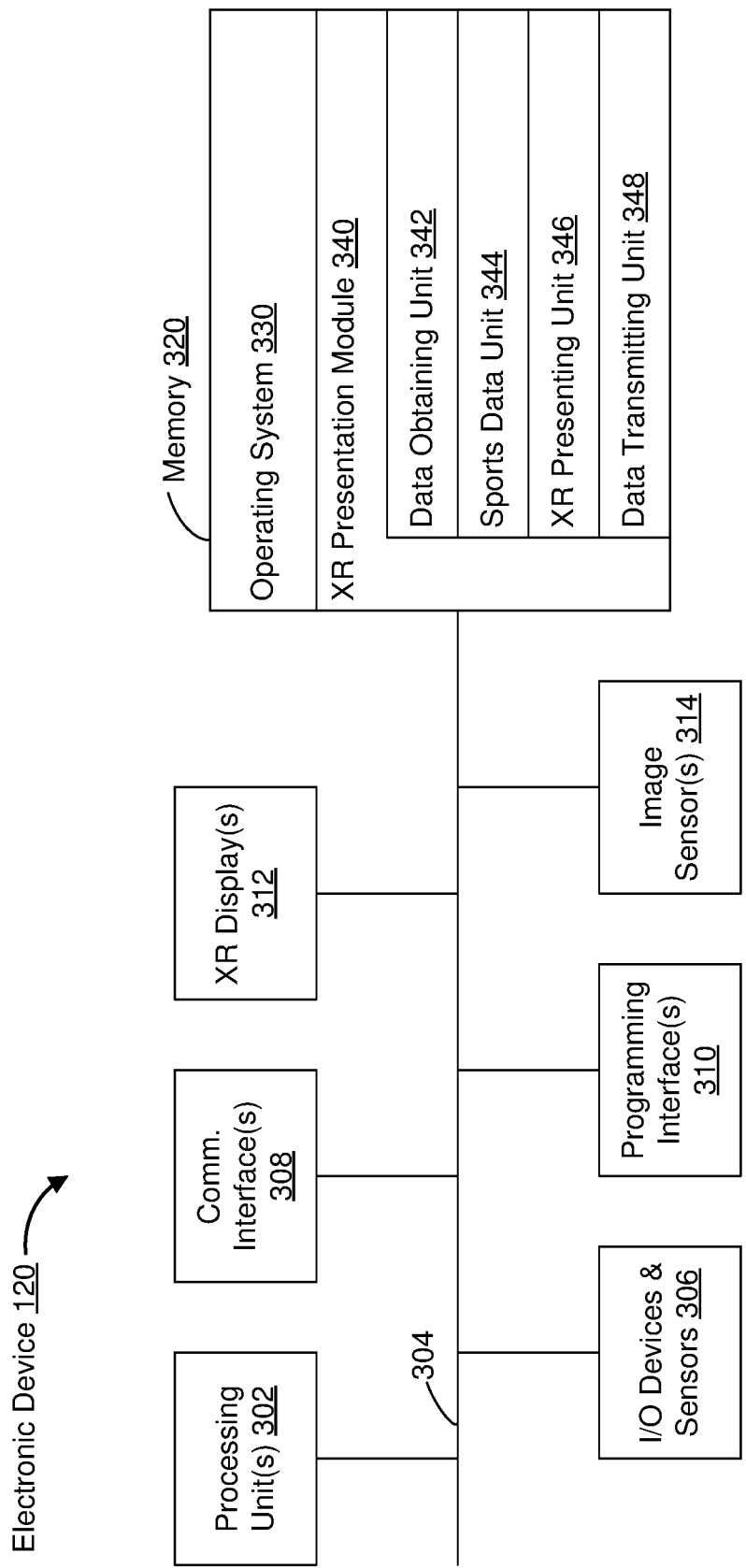
FIG. 3 is a block diagram of an example electronic device in accordance with some implementations.

FIG. 3 is a block diagram of an example of the electronic device 120 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the electronic device 120 includes one or more processing units 302 (e.g., microprocessors, ASICs, FPGAs, GPUs, CPUs, processing cores, and/or the like), one or more input/output (I/O) devices and sensors 306, one or more communication interfaces 308 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, and/or the like type interface), one or more programming (e.g., I/O) interfaces 310, one or more XR displays 312, one or more optional interior- and/or exterior-facing image sensors 314, a memory 320, and one or more communication buses 304 for interconnecting these and various other components.

In some implementations, the one or more communication buses 304 include circuitry that interconnects and controls communications between system components. In some implementations, the one or more I/O devices and sensors 306 include at least one of an inertial measurement unit (IMU), an accelerometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), and/or the like.

In some implementations, the one or more XR displays 312 are configured to provide the XR experience to the user. In some implementations, the one or more XR displays 312 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electro-mechanical system (MEMS), and/or the like display types. In some implementations, the one or more XR displays 312 correspond to diffractive, reflective, polarized, holographic, etc. waveguide displays. For example, the electronic device 120 includes a single XR display. In another example, the electronic device includes an XR display for each eye of the user. In some implementations, the one or more XR displays 312 are capable of presenting MR and VR content.

In some implementations, the one or more image sensors 314 are configured to obtain image data that corresponds to at least a portion of the face of the user that includes the eyes of the user (any may be referred to as an eye-tracking camera). In some implementations, the one or more image sensors 314 are configured to be forward-facing so as to obtain image data that corresponds to the physical environment as would be viewed by the user if the electronic device 120 was not present (and may be referred to as a scene camera). The one or more optional image sensors 314 can include one or more RGB cameras (e.g., with a complimentary metal-oxide-semiconductor (CMOS) image sensor or a charge-coupled device (CCD) image sensor), one or more infrared (IR) cameras, one or more event-based cameras, and/or the like.

The memory 320 includes high-speed random-access memory, such as DRAM, SRAM, DDR RAM, or other random-access solid-state memory devices. In some implementations, the memory 320 includes non-volatile memory, such as one or more magnetic disk storage devices, optical disk storage devices, flash memory devices, or other non-volatile solid-state storage devices. The memory 320 optionally includes one or more storage devices remotely located from the one or more processing units 302. The memory 320 comprises a non-transitory computer readable storage medium. In some implementations, the memory 320 or the non-transitory computer readable storage medium of the memory 320 stores the following programs, modules and data structures, or a subset thereof including an optional operating system 330 and an XR presentation module 340.

The operating system 330 includes procedures for handling various basic system services and for performing hardware dependent tasks. In some implementations, the XR presentation module 340 is configured to present XR content to the user via the one or more XR displays 312. To that end, in various implementations, the XR presentation module 340 includes a data obtaining unit 342, a sports data unit 344, an XR presenting unit 346, and a data transmitting unit 348.

In some implementations, the data obtaining unit 342 is configured to obtain data (e.g., presentation data, interaction data, sensor data, location data, etc.) from at least the controller 110 of FIG. 1. To that end, in various implementations, the data obtaining unit 342 includes instructions and/or logic therefor, and heuristics and metadata therefor.

In some implementations, the sports data unit 344 is configured to obtain data regarding a current state of a sporting event. To that end, in various implementations, the sports data unit 344 includes instructions and/or logic therefor, and heuristics and metadata therefor.

In some implementations, the XR presenting unit 346 is configured to display a representation of the data via the one or more XR displays 312. To that end, in various implementations, the XR presenting unit 346 includes instructions and/or logic therefor, and heuristics and metadata therefor.

In some implementations, the data transmitting unit 348 is configured to transmit data (e.g., presentation data, location data, etc.) to at least the controller 110. In some implementations, the data transmitting unit 348 is configured to transmit authentication credentials to the electronic device. To that end, in various implementations, the data transmitting unit 348 includes instructions and/or logic therefor, and heuristics and metadata therefor.

Although the data obtaining unit 342, the sports data unit 344, the XR presenting unit 346, and the data transmitting unit 348 are shown as residing on a single device (e.g., the electronic device 120), it should be understood that in other implementations, any combination of the data obtaining unit 342, the sports data unit 344, the XR presenting unit 346, and the data transmitting unit 348 may be located in separate computing devices.

Moreover, FIG. 3 is intended more as a functional description of the various features that could be present in a particular implementation as opposed to a structural schematic of the implementations described herein. As recognized by those of ordinary skill in the art, items shown separately could be combined and some items could be separated. For example, some functional modules shown separately in FIG. 3 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

Figure 4A:
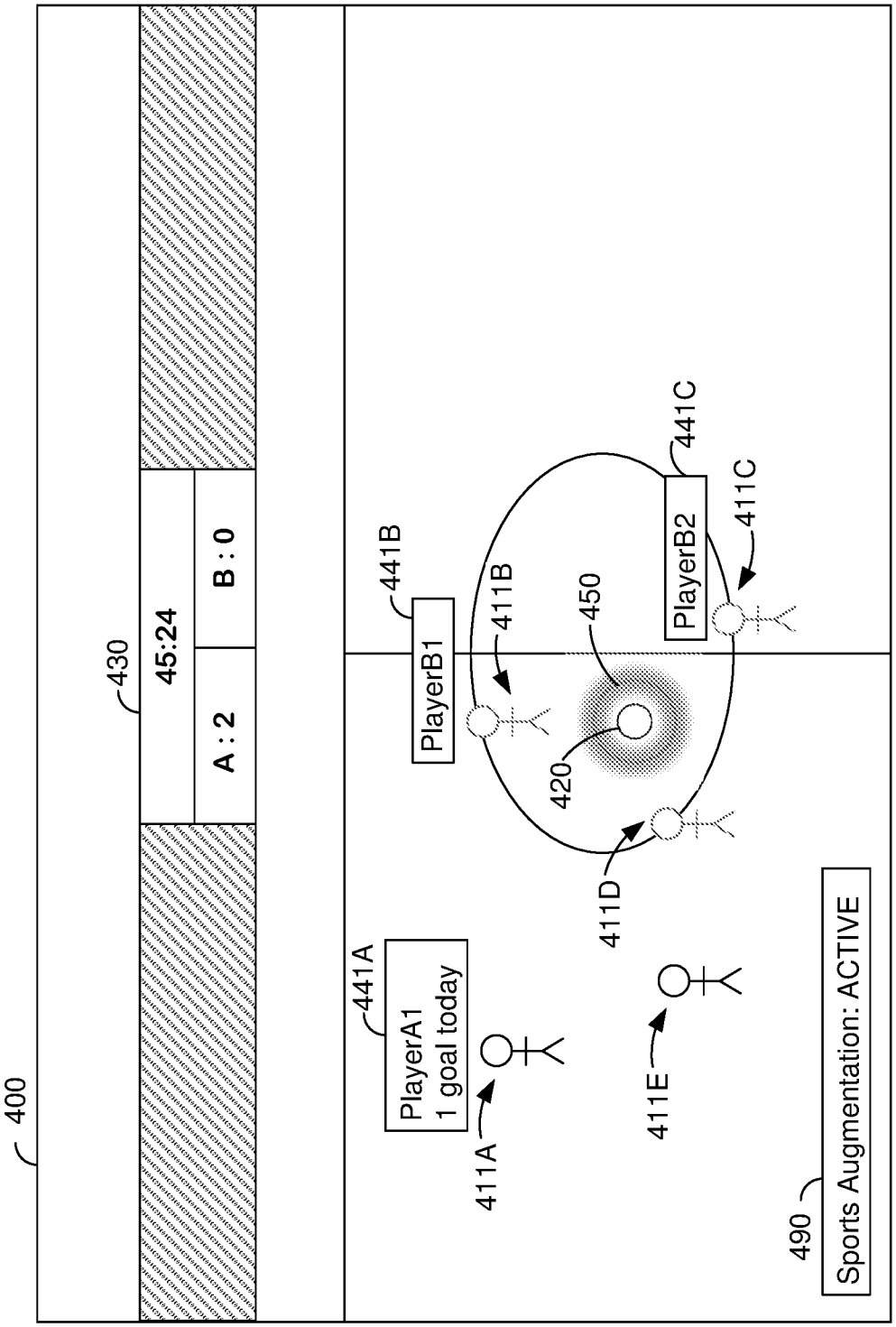
FIGS. 4A-4C illustrate an XR environment based on a physical environment including a soccer game.
Figure 4B:
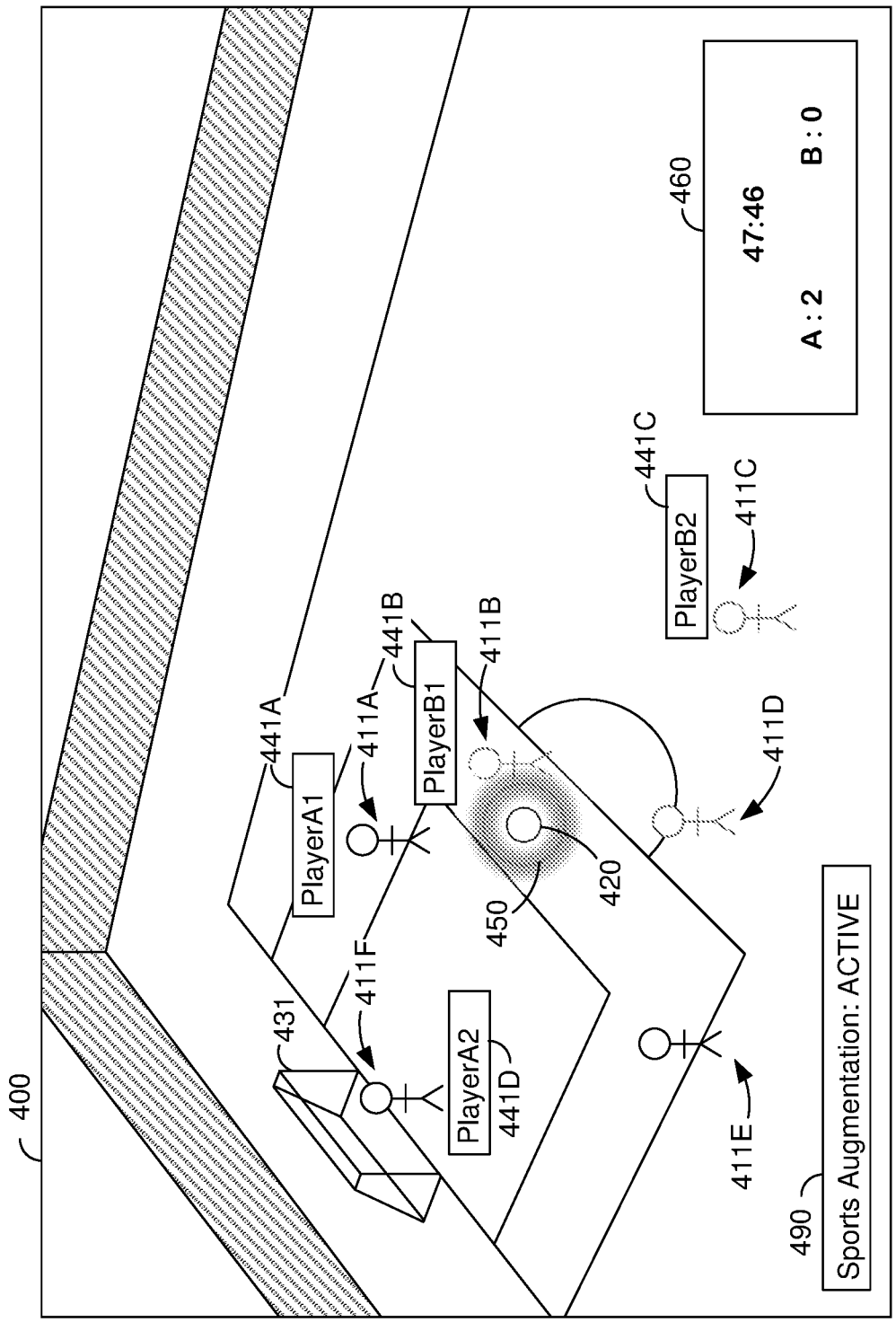
Figure 4C:
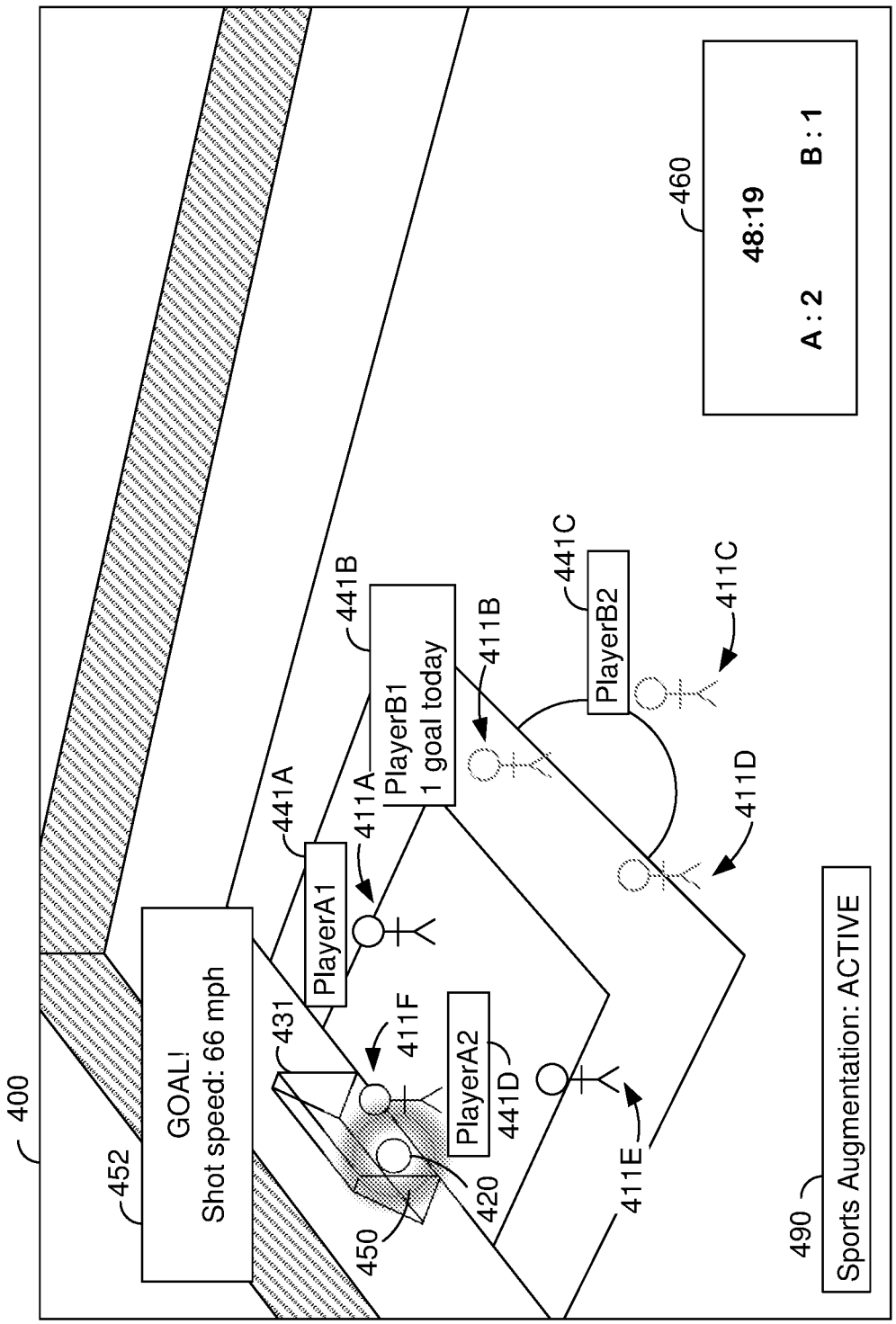

FIGS. 4A-4C illustrate a first XR environment 400 based on a physical environment including a soccer game. FIGS. 4A-4C illustrate the first XR environment 400 from the perspective of a user while the soccer game is occurring. In various implementations, the user is physically present in the physical environment. In various implementations, the perspective of the user is from a location of an image sensor of an electronic device. For example, in various implementations, the electronic device is a handheld electronic device and the perspective of the user is from a location of the image sensor of the handheld electronic device directed towards the physical environment. In various implementations, the perspective of the user is from the location of a user of the electronic device. For example, in various implementations, the electronic device is a head-mounted electronic device and the perspective of the user is from a location of the user directed towards the physical environment, generally approximating the field-of-view of the user were the head-mounted electronic device not present.

FIG. 4A illustrates the first XR environment 400 at a first time as displayed by an electronic device. At the first time, the perspective of the user is a first perspective generally directed to the midfield of the soccer field.

At the first time, the first XR environment 400 includes a plurality of objects, including one or more real objects (e.g., a plurality of players 411A-411E, a soccer ball 420, and a real scoreboard 430) and one or more virtual objects (e.g., a ball highlight 450, a plurality of player information boxes 441A-441C, and a sports augmentation indicator 490). In various implementations, the real objects 411A-411E, 420, and 430 and certain virtual objects (such as the ball highlight 450 and the plurality of player information boxes 441A-441C) are displayed at a location in the first XR environment 400, e.g., at a location defined by three coordinates in a three-dimensional (3D) XR coordinate system. Accordingly, when the user moves in the first XR environment 400 (e.g., changes either position and/or orientation), the objects are moved on the display of the electronic device, but retain their location in the first XR environment 400. In various implementations, certain virtual objects (such as the sports augmentation indicator 490) are displayed at locations on the display such that when the user moves in the first XR environment 400, the objects are stationary on the display of the electronic device.

At the first time, the first XR environment 400 includes a first player information box 441A displayed in association with a first player 411A, a second player information box 441B displayed in association with a second player 411B, and a third player information box 441C displayed in association with a third player 411C. In various implementations, the electronic device detects a player in an image of the physical environment and identifies the player. In various implementations, the electronic device identifies the player based on a jersey name and/or number and/or based on facial recognition. In various implementations, the electronic device obtains data regarding the player and displays a representation of the data in a respective player information box that is displayed in association with the player. In various implementations, the data regarding the player includes a player name, a player position, and/or statistics regarding the player. In various implementations, the statistics include game statistics, season statistics, and/or career statistics.

At the first time, the first XR environment 400 includes a ball highlight 450 displayed in association with the soccer ball 420. In various implementations, the electronic device detects the soccer ball 420 in an image of the physical environment at a location. In various implementations, the electronic device displays an indicator of the location, such as an arrow pointing at the soccer ball 420 or, as in FIGS. 4A-4C, a ball highlight 450 around the soccer ball 420.

At the first time, the first XR environment 400 includes a sports augmentation indicator 490. At the first time, the sports augmentation indicator indicates that sports augmentation is active. In various implementations, a user can activate or deactivate sports augmentation. When sports augmentation is active, the display includes computer-generated representations of data regarding a current state of the soccer game. When sports augmentation is inactive, the display does not include such computer-generated representations of the data.

At the first time, the first XR environment 400 includes a real scoreboard 430. The real scoreboard includes an indication of the game clock time and the score of the soccer game.

FIG. 4B illustrates the first XR environment 400 at a second time subsequent to the first time. At the second time, the perspective of the user is a second perspective generally directed to the goal area of the soccer field.

At the second time, due to the change in perspective, the first XR environment 400 includes additional real objects (e.g., a goalie 411F and a goal 431), no longer includes real objects (e.g., the real scoreboard 430), and includes additional virtual objects (e.g., an additional player information box 441D displayed in association with the goalie 411F and a virtual scoreboard 460).

In various implementations, the electronic device detects the real scoreboard 430 in an image of the physical environment and extracts data regarding a current state of soccer game from the real scoreboard 430, such as a game clock time and/or a score. In various implementations, the electronic device updates the game clock time based on a time elapsed. In various implementations, the electronic device displays the virtual scoreboard 460 when the real scoreboard 430 is not in the field-of-view of the current perspective of the user.

FIG. 4C illustrates the first XR environment 400 at a third time subsequent to the first time. At the third time, the perspective of the user is a second perspective generally directed to the goal area of the soccer field.

At the third time, the soccer ball 420 has moved position to within the goal 431. Accordingly, at the third time, the first XR environment 400 includes an additional virtual object, a goal indicator 452. In various implementations, the electronic device detects, in an image of the physical environment, that the soccer ball 420 has entered the goal 431 and, in response, displays the goal indicator 452. In various implementations, the goal indicator includes a speed of the soccer ball 420 as determined by the electronic device based on video of the physical environment.

Further in response to detecting that the soccer ball 420 has entered the goal 431, the second player information box 441B and the virtual scoreboard 460 are updated to reflect that a goal has been scored.

Figure 5:
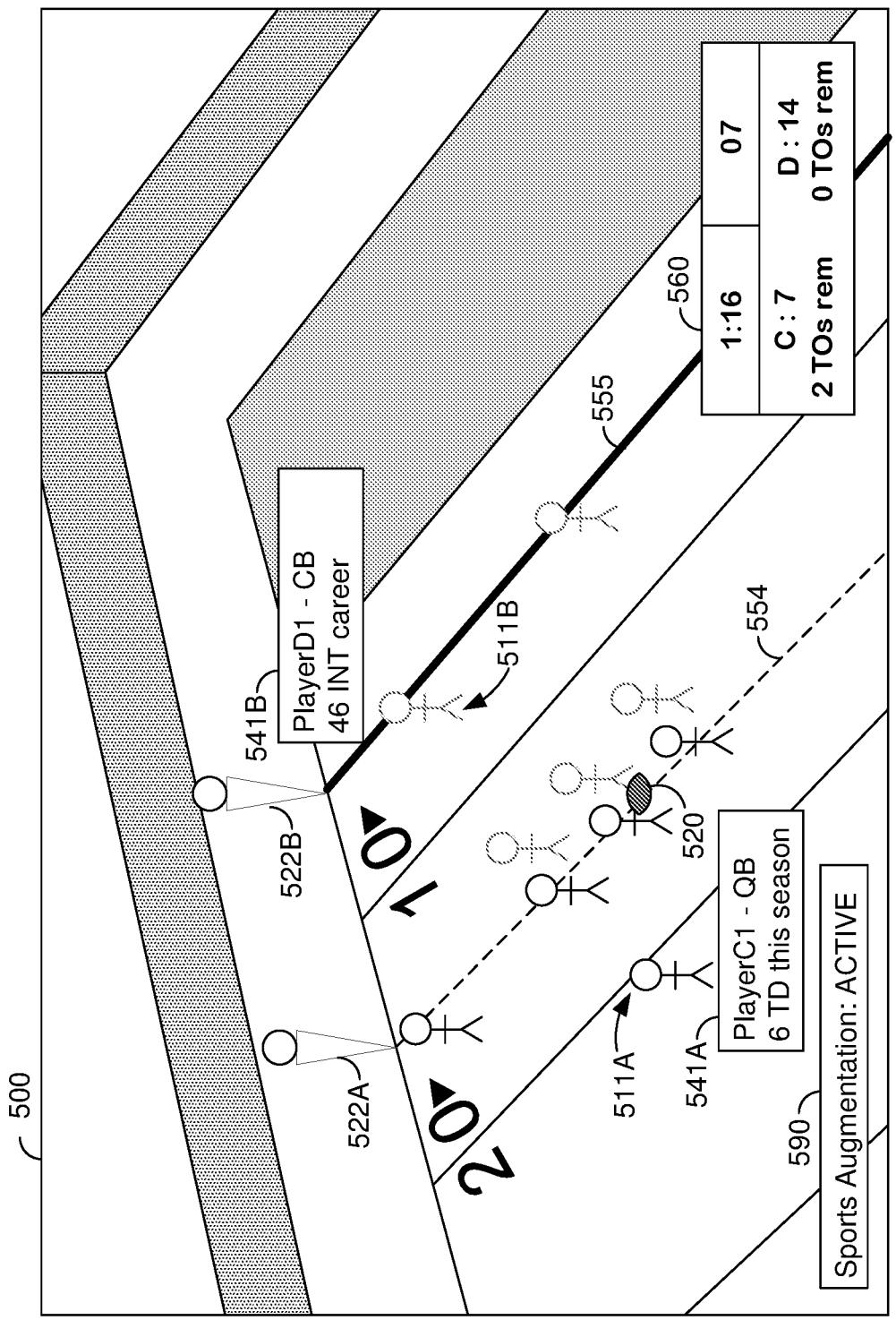
FIG. 5 illustrates an XR environment based on a physical environment including a football game.

FIG. 5 illustrates a second XR environment 500 based on a physical environment including a football game. FIG. 5 illustrates the second XR environment 500 from the perspective of a user while the football game is occurring. In various implementations, the user is physically present in the physical environment. In various implementations, the perspective of the user is from a location of an image sensor of an electronic device. For example, in various implementations, the electronic device is a handheld electronic device and the perspective of the user is from a location of the image sensor of the handheld electronic device directed towards the physical environment. In various implementations, the perspective of the user is from the location of a user of the electronic device. For example, in various implementations, the electronic device is a head-mounted electronic device and the perspective of the user is from a location of the user directed towards the physical environment, generally approximating the field-of-view of the user were the head-mounted electronic device not present.

The second XR environment 500 includes a plurality of objects, including one or more real objects (e.g., a plurality of players 511A-511B, a football 520, and two signal poles 522A-522B) and one or more virtual objects (e.g., a plurality of player information boxes 541A-541B, a scrimmage line 554, a first-down line 555, a virtual scoreboard 560, and a sports augmentation indicator 590). In various implementations, the real objects 511A-511B, 520, and 522A-522B and certain virtual objects (such as the plurality of player information boxes 541A-541B, the scrimmage line 554, and the first-down line 555) are displayed at a location in the second XR environment 500, e.g., at a location defined by three coordinates in a three-dimensional (3D) XR coordinate system. Accordingly, when the user moves in the second XR environment 500 (e.g., changes either position and/or orientation), the objects are moved on the display of the electronic device, but retain their location in the second XR environment 500. In various implementations, certain virtual objects (such as the virtual scoreboard 560 and the sports augmentation indicator 590) are displayed at locations on the display such that when the user moves in the second XR environment 500, the objects are stationary on the display of the electronic device.

The second XR environment 500 includes a scrimmage line 554 that is displayed on the field at the line of scrimmage of the football game. In various implementations, the electronic device detects, in an image of the physical environment, the football 520 and displays a line at the location of the football 520. In various implementations, the electronic device detects, in an image of the physical environment, the signal pole 522A and displays a line at the location of the signal pole 522A.

The second XR environment 500 includes a first-down line 555 that is displayed on the field at the first-down yardage. In various implementations, the device detects, in an image of the physical environment, the signal pole 522B and displays a line at the location of the signal pole 522B.

The virtual scoreboard 560 includes a game clock, a play clock, a score, and the number of timeouts remaining for each team. In various implementations, the virtual scoreboard 560 includes fewer or additional items. In various implementations, the electronic device retrieves this data (or any data represented by the virtual objects) via a network interface.

FIG. 6 is a flowchart representation of a method 600 of displaying sports data in accordance with some implementations. In various implementations, the method 600 is performed by a device with an image sensor, one or more processors, and non-transitory memory (e.g., the electronic device 120 of FIG. 3). In some implementations, the method 600 is performed by processing logic, including hardware, firmware, software, or a combination thereof. In some implementations, the method 600 is performed by a processor executing instructions (e.g., code) stored in a non-transitory computer-readable medium (e.g., a memory).

The method 600 begins, in block 610, with the device obtaining, using the image sensor, an image of a physical environment including a sporting event. For example, FIGS. 4A-4C illustrate multiple images of a physical environment including a soccer game. As another example, FIG. 5 illustrates an image of a physical environment including a football game. In various implementations, the image of the physical environment includes any type of sporting event including, but not limited to, a soccer game, a football game, a baseball game, a hockey game, a golfing tournament, or a tennis match.

The method 600 continues, in block 620, with the device detecting, in the image of the physical environment, an object. In various implementations, the device detects the object using one or more object recognition algorithms. In various implementations, the device detects an item of sports equipment. For example, in various implementations, the device detects a ball, a puck, a birdie, or a baseball glove. As an example, in FIG. 4A, the electronic device detects the soccer ball 420. As another example, in FIG. 5, the electronic device detects the football 520. In various implementations, the device detects a participant in the sporting event. As an example, in FIG. 4A, the electronic device detects the plurality of players 411A-411E. As another example, in FIG. 5, the electronic device detects the plurality of players 511A-511B.

The method 600 continues, in block 630, with the device obtaining data regarding a current state of the sporting event with respect to the object. In various implementations, the device determines, based on the image of the physical environment, a location of the object. For example, in FIG. 4A, the electronic device detects the soccer ball 420 and determines a location of the soccer ball 420. As another example, in FIG. 5, the electronic device detects the signal pole 522B and determines a location of the signal pole 522B. In various implementations, the device determines, based on the image of the physical environment, a speed of the object. For example, in FIG. 4C, the electronic device detects the soccer ball 420 and determines a speed of the soccer ball 420 as it enters the goal 431. In various implementations, the device determines the speed of a tennis ball following a serve. In various implementations, the device determines the speed of a baseball being pitched.

In various implementations, the device obtains the data via a network interface. For example, in FIG. 5, the electronic device obtains data for the virtual scoreboard 560 via a network interface.

In various implementations, the device identifies a participant in the sporting event and obtains data regarding the participant. For example, in FIG. 4A, the electronic device obtains data regarding the player 411A to populate the player information box 441A.

The method 600 continues, in block 640, with the device displaying, displaying, on the display in association with the physical environment, a representation of the data. In various implementations, the display is an opaque display and the representation of the data is displayed in association with the physical environment as a composite image of the representation of the data and an image of the physical environment. Thus, in various implementations, displaying the representation of the data includes displaying, based on the image of the physical environment, an image representation of the physical environment including the representation of the data. In various implementations, the display is a transparent display and the representation of the data is displayed in association with the physical environment as a projection over a view of the physical environment.

In various implementations, the device displays the representation of the data by displaying a virtual object at a location of the object. For example, in FIG. 4A, the electronic device displays the ball highlight 450 at the location of the soccer ball 420. As another example, in FIG. 5, the electronic device displays the player information box at the location of the player 511A.

In various implementations, the device displays the representation of the data by displaying a line at a first-down location. For example, in FIG. 5, the electronic device displays the first-down line 555 at the location of the signal pole 522B.

In various implementations, the device displays the representation of the data by displaying a virtual object along an edge of the display, such as the bottom of the display or the top of the display. In various implementations, the device displays the representation of the data by displaying a virtual object in a corner of the display. For example, in FIG. 5, the virtual scoreboard 560 is displayed in a corner of the display.

In various implementations, the device displays the representation of the data by displaying a clock or timer associated with the sporting event. For example, in FIG. 4B, the electronic device displays the virtual scoreboard 460 including a game clock time of the soccer game. As another example, in FIG. 5, the electronic device displays the virtual scoreboard 560 including a play clock of the football game. In various implementations, the clock or timer includes a game time, a shot clock, or a play clock.

In various implementations, the device tracks a current time of the clock or timer. For example, in various implementations, the device detects, in an image of the physical environment taken at a first time, a first time of the clock or timer. For example, in FIG. 4A, the electronic device detects the game clock time of 45:24 on the real scoreboard 430. In various implementations, the device displays, at a second time after the first time, a second time of the clock or timer based on a difference between the second time and the first time. For example, in FIG. 4B, the electronic device displays the game clock time of 47:46. In various implementations, at the second time when the second time of the clock or timer is displayed, the clock or timer is not within the field-of-view of the image sensor. For example, in FIG. 4B, the real scoreboard 430 is not within the field-of-view of the image sensor when the virtual scoreboard is displayed 460.

In various implementations, the device displays the representation of the data by displaying a score of the sporting event. For example, in FIG. 4B, the electronic device displays the virtual scoreboard 460 including a score of the soccer game. As another example, in FIG. 5, the electronic device displays the virtual scoreboard 560 including a score of the football game.

In various implementations, the device tracks a current score of the sporting event. For example, in various implementations, the device detects, in an image of the physical environment taken at a first time, a first score of the sporting event. For example, in FIG. 4A, the electronic device detects the score of 2-0 on the real scoreboard 430. In various implementations, the device displays, at a second time after the first time, the first score of the sporting event. For example, in FIG. 4B, the electronic device displays the score of 2-0 on the virtual scoreboard 460. In various implementations, at the second time when the first score is displayed, the first score is not within the field-of-view of the image sensor.

In various implementations, the device updates the score by detecting a scoring event. In various implementations, the device detects, in an image of the physical environment taken at a third time, a scoring event. For example, in FIG. 4C, the electronic device detects that the soccer ball 420 has entered the goal 431. In various implementations, in response to detecting the scoring event, the device displays a second score of the sporting event (e.g., the score updated by the scoring event). For example, in FIG. 4C, the electronic device displays an updated score of 2-1 on the virtual scoreboard.

In various implementations, the device updates the score by detecting an updated scoreboard. In various implementations, the device detects, in an image of the physical environment taken at a third time after the second time, a second score of the sporting event. In various implementations, the device displays, at a fourth time after the third time, the second score of the sporting event. In various implementations, at the fourth time when the first score is displayed, the second score is not within the field-of-view of the image sensor.

Thus, in various implementations, the device detects, in the image of the physical environment taken at a first time, an object indicating the current state of the sporting event. As noted above, examples include a score or a clock. In various implementations, device displays the current state of the sporting event when the object is not within the field-of-view of the image sensor. Thus, in various implementations, the device determines, at a second time after the first time, that the object is not within a field-of-view of the image sensor and, in response to determining that the object is not within the field-of-view of the image sensor, displaying the representation of the data.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first," "second," etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:
   at a device including an image sensor, a display, one or more processors, and non-transitory memory:
   obtaining, using the image sensor, a first image, taken at a first time, of a physical environment;
   detecting, in the first image, an object indicating a current state;
   in response to determining, at a second time after the first time, that the object is not within a field-of-view of the image sensor, displaying, on the display in association with the physical environment, a representation of the current state; and
   in response to determining, at a third time after the second time, that the object is within the field-of-view of the image sensor, ceasing to display the representation of the current state.

2. The method of claim 1, wherein the object indicates a current state of a sporting event.

3. The method of claim 2, wherein the object indicates a current score of the sporting event or a current game time of the sporting event.

4. The method of claim 1, wherein the object indicates a current time.

5. The method of claim 1, wherein the object indicates the current state textually.

6. The method of claim 1, wherein the object indicates the current state numerically.

7. The method of claim 1, wherein detecting the object indicating the current state further includes determining, based on the first image, the current state.

8. The method of claim 1, wherein displaying the representation of the current state includes displaying a representation of a first state and updating the representation to display a representation of a second state.

9. The method of claim 8, wherein updating the representation is based on a time elapsed.

10. The method of claim 8, wherein updating the representation is based on detecting, using the image sensor, an event.

11. The method of claim 8, wherein updating the representation is based on data obtained via a network interface.

12. The method of claim 1, further comprising receiving a user input to activate display of the representation of the current state, wherein displaying the representation of the current state is performed further in response to receiving the user input.

13. A device comprising:
   an image sensor;
   a display;
   a non-transitory memory; and
   one or more processors to:
      obtain, using the image sensor, a first image, taken at a first time, of a physical environment;
      detect, in the first image, an object indicating a current state;
      in response to determining, at a second time after the first time, that the object is not within a field-of-view of the image sensor, display, on the display in association with the physical environment, a representation of the current state; and
      in response to determining, at a third time after the second time, that the object is within the field-of-view of the image sensor, cease to display the representation of the current state.

14. The device of claim 13, wherein the object indicates a current time.

15. The device of claim 13, wherein the object indicates the current state textually.

16. The device of claim 13, wherein the one or more processors are to display the representation of the current state by displaying a representation of a first state and updating the representation to display a representation of a second state.

17. The device of claim 16, wherein the one or more processors are to update the representation based on a time elapsed.

18. The device of claim 16, wherein the one or more processors are to update the representation based on detecting, using the image sensor, an event.

19. The device of claim 16, wherein the one or more processors are to update the representation based on data obtained via a network interface.

20. A non-transitory computer-readable medium having instructions encoded thereon which, when executed by one or more processors of a device including an image sensor and a display, cause the device to:
   obtain, using the image sensor, a first image, taken at a first time, of a physical environment;
   detect, in the first image, an object indicating a current state;
   in response to determining, at a second time after the first time, that the object is not within a field-of-view of the image sensor, display, on the display in association with the physical environment, a representation of the current state; and
   in response to determining, at a third time after the second time, that the object is within the field-of-view of the image sensor, cease to display the representation of the current state.

* * * * *